(12) United States Patent
Chu

(10) Patent No.: US 11,804,794 B2
(45) Date of Patent: Oct. 31, 2023

(54) MOTOR CONTROLLER

(71) Applicant: Global Mixed-mode Technology Inc., Hsin-Chu (TW)

(72) Inventor: Chien-Lun Chu, Hsinchu County (TW)

(73) Assignee: Global Mixed-mode Technology Inc., Hsin-Chu (TW)

(*) Notice: Subject to any disclaimer, the term of this patent is extended or adjusted under 35 U.S.C. 154(b) by 43 days.

(21) Appl. No.: 17/335,099

(22) Filed: Jun. 1, 2021

(65) Prior Publication Data
US 2022/0385220 A1 Dec. 1, 2022

(51) Int. Cl.
*H02P 6/16* (2016.01)
*H02P 23/14* (2006.01)

(52) U.S. Cl.
CPC .................. *H02P 23/14* (2013.01)

(58) Field of Classification Search
CPC .......... H02P 23/14; H02P 21/00; H02P 25/00; H02P 27/00; H02P 23/00
USPC .................... 318/400.32
See application file for complete search history.

(56) References Cited

U.S. PATENT DOCUMENTS

| 6,504,328 B1 | 1/2003 | Gontowski |
| 6,580,236 B2 | 6/2003 | Mitsuda |
| 7,071,646 B1* | 7/2006 | Chen ............ H03K 5/1534 318/400.06 |
| 8,148,928 B2* | 4/2012 | Laulanet ......... H02P 6/182 318/400.11 |
| 9,000,703 B2 | 4/2015 | Chew |
| 11,205,984 B1* | 12/2021 | Chen ............ H02P 6/20 |
| 2021/0091688 A1* | 3/2021 | Chen ........... H02P 6/182 |

FOREIGN PATENT DOCUMENTS

| CN | 101753076 B | 7/2014 |
| CN | 107040172 B | 4/2019 |
| CN | 108054973 B | 9/2019 |
| JP | 6594974 | 10/2019 |
| TW | 571508 | 1/2004 |

* cited by examiner

*Primary Examiner* — Kawing Chan
*Assistant Examiner* — Gabriel Agared
(74) *Attorney, Agent, or Firm* — Winston Hsu

(57) ABSTRACT

A motor controller comprises a switch circuit and a control unit. The motor controller is used for driving a motor, where the motor has a coil. The switch circuit is configured to supply a coil current to the coil. The control unit is configured to generate a plurality of control signals to control the switch circuit. The motor controller enables a floating phase time to be a variable value, where the floating phase time has a stable interval and a detecting interval. The motor controller enables a zero point of the coil current to appear in the stable interval, so as to detect a phase switching time point in a stable way and avoid a noise problem. The motor controller detects a zero crossing point of a back electromotive force in the detecting interval.

12 Claims, 2 Drawing Sheets

MOTOR CONTROLLER

BACKGROUND OF THE INVENTION

1. Field of the Invention

The present invention relates to a motor controller, and more particularly, to a motor controller which is capable of detecting a phase switching time point in a stable way.

2. Description of the Prior Art

Conventionally, there are two driving methods for driving a motor. The first driving method uses the Hall sensor for switching phases, so as to drive the motor. The second driving method does not use the Hall sensor to drive the motor. The Hall sensor is affected by the external environment easily, such that the detecting accuracy is decreased. Besides, the installation of the Hall sensor results in an increase of the volume and the cost of the system. Therefore, the sensorless driving method is provided for solving the above problems.

In the sensorless driving method, the motor controller utilizes a fixed floating phase time to detect a phase switching time point. When the floating phase time is too large, it results in a noise problem. When the floating phase time is too small, if the current of the motor coil cannot be released completely in time, an erroneous phase switching time point may be detected by the motor controller. Therefore, when the power voltage or the load of the motor changes, a novel motor controller is needed to detect the phase switching time point in a stable way and avoid the noise problem.

SUMMARY OF THE INVENTION

According to the present invention, a motor controller which is capable of detecting a phase switching time point in a stable way is provided. The motor controller is used for driving the motor, where the motor may be a three-phase motor. The motor has a first coil, a second coil, and a third coil. The motor controller comprises a switch circuit, a control unit, and a detecting unit. The switch circuit includes a first transistor, a second transistor, a third transistor, a fourth transistor, a fifth transistor, a sixth transistor, a first terminal, a second terminal, and a third terminal, where the switch circuit is coupled to the motor for driving the motor. The first terminal, the second terminal, and the third terminal respectively provides a first driving signal, a second driving signal, and the third driving signal for driving the motor. The first transistor is coupled to a fourth terminal and the first terminal while the second transistor is coupled to the first terminal and a fifth terminal. The third transistor is coupled to the fourth terminal and the second terminal while the fourth transistor is coupled to the second terminal and the fifth terminal. The fifth transistor is coupled to the fourth terminal and the third terminal while the sixth transistor is coupled to the third terminal and the fifth terminal. The system may provide a power voltage to the motor controller via the fourth terminal, so as to enable the motor controller to operate normally.

One terminal of the first coil is coupled to the first terminal. One terminal of the second coil is coupled to the second terminal. One terminal of the third coil is coupled to the third terminal. Furthermore, another terminal of the first coil is coupled to another terminal of the second coil and another terminal of the third coil. That is to say, the first coil, the second coil, and the third coil form a Y-shaped configuration. The control unit generates a first control signal, a second control signal, a third control signal, a fourth control signal, a fifth control signal, and a sixth control signal for respectively controlling the ON/OFF states of the first transistor, the second transistor, the third transistor, the fourth transistor, the fifth transistor, and the sixth transistor. The detecting unit is coupled to the first terminal, the second terminal, and the third terminal, so as to generate a first detecting signal and the second detecting signal to the control unit. The detecting unit may be used for detecting the current of the first coil and a back electromotive force of a floating phase. The switch circuit is configured to supply the current of the first coil to the first coil.

In order to solve the prior-art problem, the motor controller enables a floating phase time to be a variable value, where the floating phase time has a stable interval and a detecting interval. The motor controller enables the first driving signal to have the floating phase time, where the floating phase is formed in the first coil. When the current of the first coil is zero, the detecting unit enables the first detecting signal to change from a low level to a high level. At this moment the motor controller judges whether or not the zero point of the current of the first coil is located in the stable interval. When the zero point of the current of the first coil appears before the stable interval, the motor controller enables that the next floating phase time is less than the current floating phase time, so as to reduce the noise and increase the efficiency. When the zero point of the current of the first coil appears after the stable interval, the motor controller enables that the next floating phase time is greater than the current floating phase time, so as to detect a phase switching time point in a stable way and increase a success rate of detecting the phase switching time point. When the zero point of the current of the first coil appears in the stable interval, the motor controller enables that the next floating phase time is equal to the current floating phase time. By the modulation mechanism, the motor controller may enable the zero point of the current of the first coil to appear in the desired stable interval. Then, when the detecting unit detects a zero crossing point of a back electromotive force in the detecting interval, the detecting unit enables the second detecting signal to change from the low level to the high level, so as to inform the control unit to carry out a phase switching procedure. Thus, when the power voltage or the load of the motor changes, the motor controller may automatically adjust the floating phase time to detect the phase switching time point in a stable way and avoid a noise problem.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
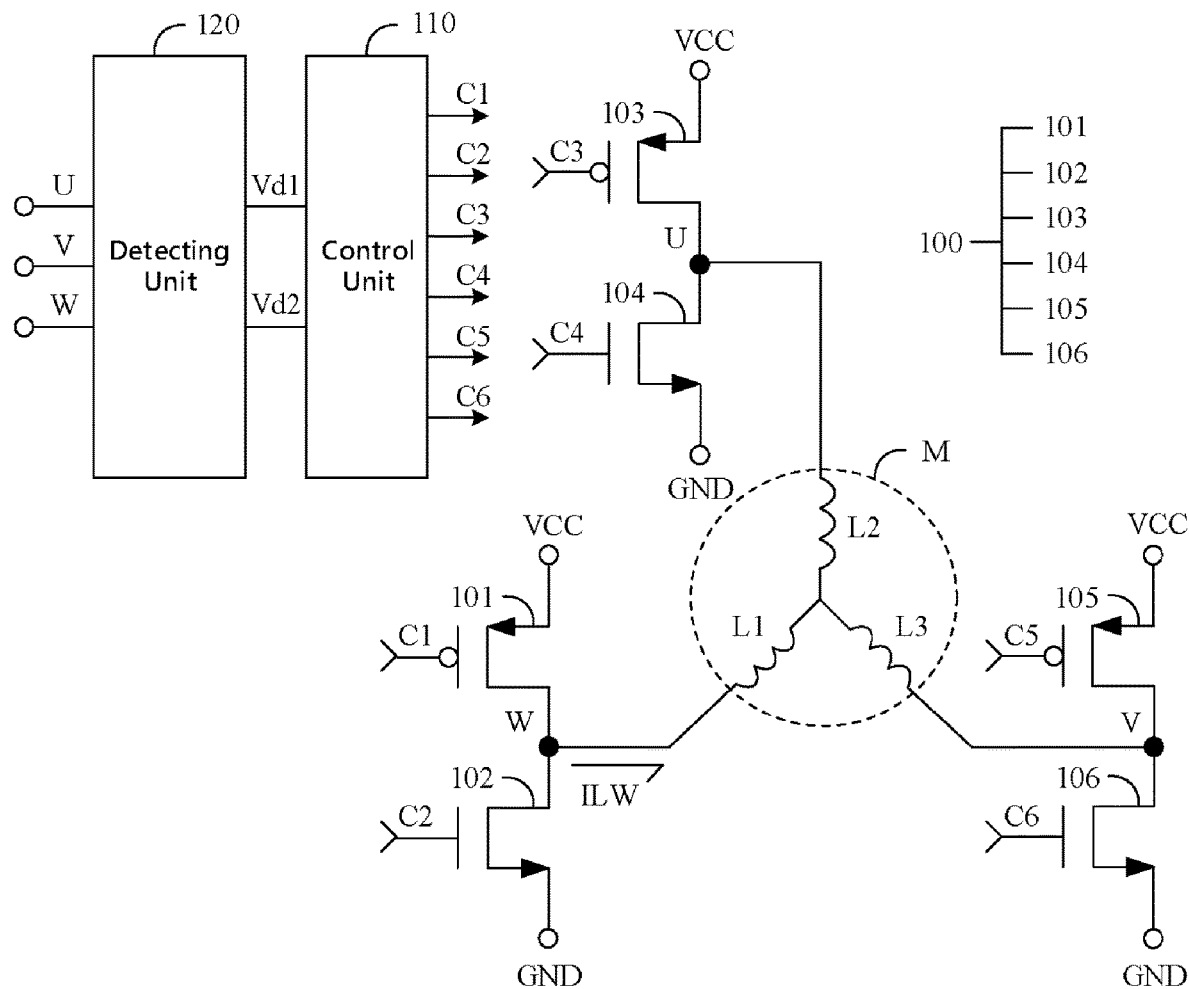
FIG. 1 is a schematic diagram showing a motor controller according to one embodiment of the present invention.

FIG. 1 is a schematic diagram showing a motor controller 10 according to one embodiment of the present invention. The motor controller 10 is used for driving a motor M, where the motor M may be a three-phase motor. The motor M has a first coil L1, a second coil L2, and a third coil L3. The motor controller 10 comprises a switch circuit 100, a control unit 110, and a detecting unit 120. The switch circuit 100 includes a first transistor 101, a second transistor 102, a third transistor 103, a fourth transistor 104, a fifth transistor 105, a sixth transistor 106, a first terminal W, a second terminal U, and a third terminal V, where the switch circuit 100 is coupled to the motor M for driving the motor M. The first terminal W, the second terminal U, and the third terminal V respectively provides a first driving signal WO, a second driving signal UO, and the third driving signal VO for driving the motor M. The first transistor 101 is coupled to a fourth terminal VCC and the first terminal W while the second transistor 102 is coupled to the first terminal W and a fifth terminal GND. The third transistor 103 is coupled to the fourth terminal VCC and the second terminal U while the fourth transistor 104 is coupled to the second terminal U and the fifth terminal GND. The fifth transistor 105 is coupled to the fourth terminal VCC and the third terminal V while the sixth transistor 106 is coupled to the third terminal V and the fifth terminal GND. The system may provide a power voltage to the motor controller 10 via the fourth terminal VCC, so as to enable the motor controller 10 to operate normally. Each of the first transistor 101, the third transistor 103, and the fifth transistor 105 may be a p-type MOSFET. Each of the second transistor 102, the fourth transistor 104, and the sixth transistor 106 may be an n-type MOSFET.

One terminal of the first coil L1 is coupled to the first terminal W. One terminal of the second coil L2 is coupled to the second terminal U. One terminal of the third coil L3 is coupled to the third terminal V. Furthermore, another terminal of the first coil L1 is coupled to another terminal of the second coil L2 and another terminal of the third coil L3. That is to say, the first coil L1, the second coil L2, and the third coil L3 form a Y-shaped configuration. The control unit 110 generates a first control signal C1, a second control signal C2, a third control signal C3, a fourth control signal C4, a fifth control signal C5, and a sixth control signal C6 for respectively controlling the ON/OFF states of the first transistor 101, the second transistor 102, the third transistor 103, the fourth transistor 104, the fifth transistor 105, and the sixth transistor 106. The detecting unit 120 is coupled to the first terminal W, the second terminal U, and the third terminal V, so as to generate a first detecting signal Vd1 and the second detecting signal Vd2 to the control unit 110. The detecting unit 120 may be used for detecting the current ILW of the first coil L1 and a back electromotive force of a floating phase. The switch circuit 100 is configured to supply the current ILW of the first coil L1 to the first coil L1.

Figure 2:
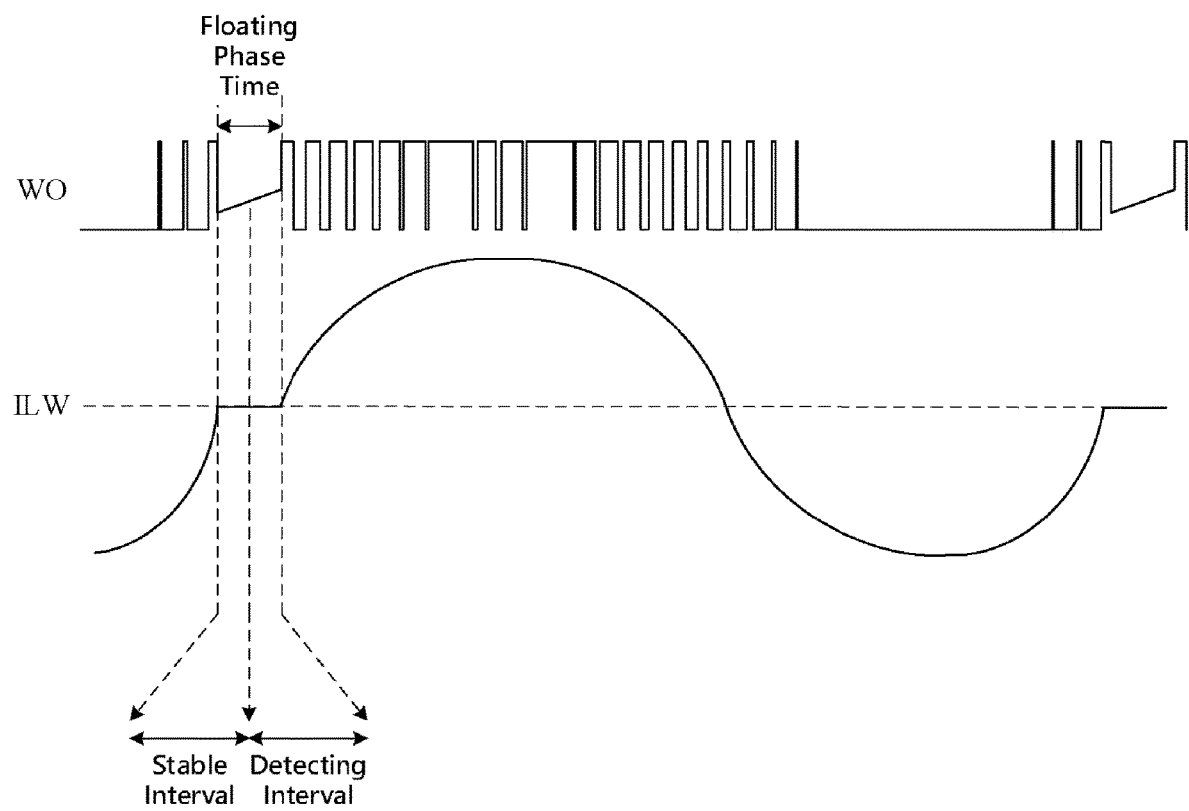
FIG. 2 is a timing chart according to one embodiment of the present invention.

FIG. 2 is a timing chart according to one embodiment of the present invention. In order to solve the prior-art problem, the motor controller 10 enables a floating phase time to be a variable value, where the floating phase time has a stable interval and a detecting interval. As shown in FIG. 2, the motor controller 10 enables the first driving signal WO to have the floating phase time, where the floating phase is formed in the first coil L1. When the current ILW of the first coil L1 is zero, the detecting unit 120 enables the first detecting signal Vd1 to change from a low level to a high level. At this moment the motor controller 10 judges whether or not the zero point of the current ILW of the first coil L1 is located in the stable interval. When the zero point of the current ILW appears before the stable interval, the motor controller 10 enables that the next floating phase time is less than the current floating phase time, so as to reduce the noise and increase the efficiency. When the zero point of the current ILW appears after the stable interval, the motor controller 10 enables that the next floating phase time is greater than the current floating phase time, so as to detect a phase switching time point in a stable way and increase a success rate of detecting the phase switching time point. When the zero point of the current ILW appears in the stable interval, the motor controller 10 enables that the next floating phase time is equal to the current floating phase time. By the modulation mechanism, the motor controller 10 may enable the zero point of the current ILW to appear in the desired stable interval. Then, when the detecting unit 120 detects a zero crossing point of a back electromotive force in the detecting interval, the detecting unit 120 enables the second detecting signal Vd2 to change from the low level to the high level, so as to inform the control unit 110 to carry out a phase switching procedure. Thus, when the power voltage or the load of the motor M changes, the motor controller 10 may automatically adjust the floating phase time to detect the phase switching time point in a stable way and avoid a noise problem.

One embodiment of the present invention utilizes a variable floating phase time technology, so as to enable a zero point of a coil current to appear in a stable interval. The motor controller 10 may automatically adjust the floating phase time, such that the floating phase time is an optimum value. By the variable floating phase time technology, the motor controller 10 may detect the phase switching time point in a stable way and avoid the noise problem. The motor controller 10 may be applied to a single-phase or polyphase configuration.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller, wherein the motor controller is used for driving a motor, the motor has a coil, and the motor controller comprising:
    a switch circuit, configured to supply a coil current to the coil; and
    a control unit, configured to generate a plurality of control signals to control the switch circuit, wherein the motor controller enables a floating phase time to be a variable value, and the coil is floated during the floating phase time,
    wherein the floating phase time comprises a stable interval, when a zero point of the coil current appears before the stable interval, the motor controller enables that the next floating phase time is less than the current floating phase time,
    wherein when the zero point of the coil current appears after the stable interval, the motor controller enables that the next floating phase time is greater than the current floating phase time, and wherein when the zero point of the coil current appears in the stable interval, the motor controller enables that the next floating phase time is equal to the current floating phase time.

2. The motor controller of claim 1, wherein the motor controller is configured to detect a phase switching time point in a stable way.

3. The motor controller of claim 1, wherein the motor controller automatically adjusts the floating phase time.

4. The motor controller of claim 1, wherein the floating phase time comprises a detecting interval, and the motor controller detects a zero crossing point of a back electromotive force in the detecting interval.

5. The motor controller of claim 1, wherein the motor controller further comprises a detecting unit, and the detecting unit is configured to generate a first detecting signal and a second detecting signal to the control unit.

6. The motor controller of claim 1, wherein the motor controller is applied to a single-phase or polyphase configuration.

7. A motor controller, wherein the motor controller is used for driving a motor, the motor has a coil, and the motor controller comprising:
 a switch circuit, configured to supply a coil current to the coil; and
 a control unit, configured to generate a plurality of control signals to control the switch circuit, wherein the motor controller enables a zero point of the coil current to appear in a stable interval of a floating phase time, the coil is floated during the floating phase time, and the motor controller enables the floating phase time to be a variable value, wherein when the zero point of the coil current appears before the stable interval, the motor controller enables that the next floating phase time is less than the current floating phase time, wherein when the zero point of the coil current appears after the stable interval, the motor controller enables that the next floating phase time is greater than the current floating phase time, and wherein when the zero point of the coil current appears in the stable interval, the motor controller enables that the next floating phase time is equal to the current floating phase time.

8. The motor controller of claim 7, wherein the motor controller is configured to detect a phase switching time point in a stable way.

9. The motor controller of claim 7, wherein the motor controller automatically adjusts the floating phase time.

10. The motor controller of claim 7, wherein the floating phase time further comprises a detecting interval, and the motor controller detects a zero crossing point of a back electromotive force in the detecting interval.

11. The motor controller of claim 7, wherein the motor controller further comprises a detecting unit, and the detecting unit is configured to generate a first detecting signal and a second detecting signal to the control unit.

12. The motor controller of claim 7, wherein the motor controller is applied to a single-phase or polyphase configuration.

\* \* \* \* \*